F. F. BRUCKER.
METHOD OF MAKING TIRES.
APPLICATION FILED APR. 4, 1919.

1,320,121.

Patented Oct. 28, 1919.
2 SHEETS—SHEET 1.

Inventor:
Ferdinand F. Brucker,
by Shuan Middleton Donaldson & Shuan
Atty.

F. F. BRUCKER.
METHOD OF MAKING TIRES.
APPLICATION FILED APR. 4, 1919.

1,320,121.

Patented Oct. 28, 1919.
2 SHEETS—SHEET 2.

Inventor:
Ferdinand F. Brucker,
by *Swan Middleton Donaldson & Swan*
Atty's

UNITED STATES PATENT OFFICE.

FERDINAND FRANCIS BRUCKER, OF AKRON, OHIO, ASSIGNOR TO THE MILLER RUBBER COMPANY, OF AKRON, OHIO, A CORPORATION OF OHIO.

METHOD OF MAKING TIRES.

1,320,121. Specification of Letters Patent. Patented Oct. 28, 1919.

Application filed April 4, 1919. Serial No. 287,455.

*To all whom it may concern:*

Be it known that I, FERDINAND F. BRUCKER, a citizen of the United States, and resident of Akron, Ohio, have invented certain new and useful Improvements in Methods of Making Tires, of which the following is a specification.

My present invention relates to an improved method of manufacturing tires and aims to provide for the application of the final covering strips or layers to the fabric carcass in a simple, economical, expeditious and effective and accurate manner, and the invention comprises, broadly speaking, the building up of the fabric carcass in the usual manner, minus the last or outer ply of fabric and the utilization of this outer ply as a base to carry finishing layers, the said base and finishing layers being applied as a unit.

In order that my invention may more readily be understood I have appended hereto drawings illustrative of such outer ply carrying the various finishing layers and also one form of a completed tire.

In these drawings.

Figure 10:
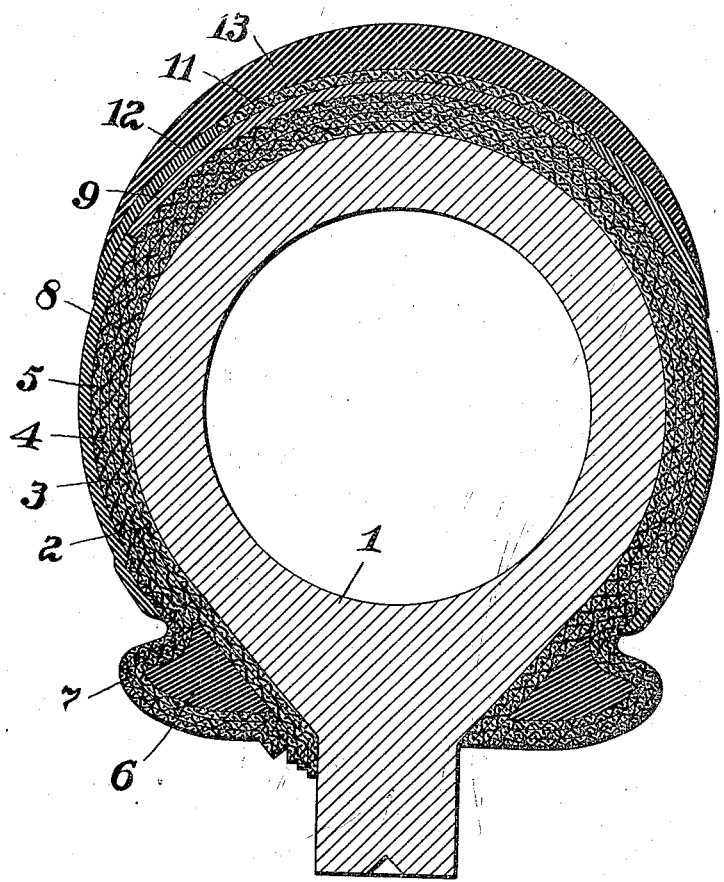
Fig. 10 is a cross sectional view of a completed tire upon the core and before vulcanization.

Heretofore in the finishing of tires it has been customary to build up the fabric carcass upon a suitable core, such as that indicated at 1 in Fig. 10 by the successive application of the requisite numbers of plies of friction fabric according to the size of the tire, such plies being shown for example at 2, 3, 4, and 5 respectively, the inner plies 2 and 3 underlying the bead 6 and plies 4 and 5 overlying the bead where a four-ply carcass is used, and thereafter the various finishing strips are applied to complete the tire structure. Due to the fact that these are, with the exception of the chafing and breaker strips, of uncured rubber stock they are difficult to handle and apply accurately and much skill and care is required of the workman in applying them by hand.

In applying strips to doubly curved surfaces it is usual to apply one edge first and then progressively apply the remainder of the strip, and in this operation it is necessary to progressively shorten the strip longitudinally in order to lay smoothly on the smaller circumferences when approaching radially toward the axis of the core in the laying movement.

Such shortening has been accomplished in the laying of fabrics by cutting such fabrics biasly whereby stretching of the fabric radially shortens it circumferentially, such shortening being accomplished by a lazy-tong movement of the fabric meshes and predetermined in extent by the weave of the fabric and the initial stretch of the first edge applied.

In applying strips of rubber compounds or like plastic material which contain no inextensible woven fabrics to limit or control their movements the distribution of the material so as to smoothly cover a doubly curved surface has in the past been found practicable only under the hand of a skilled workman and extremely difficult to accomplish by machinery. This is particularly true of the side strips which are so located on the tire as to require much contraction of the edge adjacent to the beads of the tire and attempts to spin down an unsupported side strip have invariably resulted in wrinkling of the strip and in too extended radial displacement or stretching.

In any of the modifications of my invention, however, the purpose of applying the rubber strip together with the last ply of fabric is to control the circumferential shortening and the radial lengthening of the rubber strips by the fabric supporting them, so that the rubber is constrained to follow the lazy-tong action of the threads in the fabric. By this method the rubber strips are as easy to control as the fabric itself so that placing of the rubber is predetermined, thus overcoming these difficulties.

In practising my invention I proceed by building up the tire carcass upon the core in ordinary manner up to but not including the final fabric layer which is indicated at 5.

On this final fabric layer 5 and before it is applied to the tire I apply the finishing strips. The side strips being the most difficult to apply it is obvious that if desired I may simply apply the side strips to the marginal portions of this outer fabric layer 5 which with the attached side strips 7 is applied as a unit to the incompleted carcass, either by hand or by tire building machinery of any approved type, as desired, such tire building machines as make use of spinning wheels being admirably adapted to such use.

As it is usual to include chafing strips in modern tire construction these may also be included in this unit; furthermore, the cushion strip, while not so difficult to apply separately as the side strips may advantageously be built into this unit with the side strips, thereby completing an even course or layer upon which subsequent layers may be applied. The cushion and side strips may in fact be formed of a single composition and unitary construction.

Due to their peculiar location in the tire, the chafing-strips which are made of rubber, impregnated fabric, similar to the ordinary tire fabric but lighter in weight have always been placed by hand during the finishing operation and their application by machinery ordinarily presents quite as difficult a problem as the placing of some of the rubber strips. However, I have overcome this difficulty by assembling the chafing strips to the last ply of fabric and spinning them down together.

The chafing strips being applied to the fabric layer 5 while preferably in a flat form may be readily accurately located thereon, and in fact the chafing strips may be readily applied to the fabric layer 5 by any suitable guiding and rolling devices of the usual rubber calender type.

With the chafing strips thus applied the unit may be applied to the carcass by any approved tire building machinery or by hand with the consequent saving in time and the elimination of liability of improper placing of the chafing strips by the workman.

Figure 1:
Figure 1 illustrates a fabric ply with the chafing strips applied thereto, in cross section.
Figure 2:
Fig. 2 is a similar view showing the fabric ply supporting chafing and side strips.
Figure 3:
Fig. 3 is a similar view showing such fabric ply supporting chafing strips, side strips and cushioning strip.

Thereafter the balance of the covering strips may, if desired, be applied in the usual manner. I prefer, however, to also apply other portions and in fact preferably all of the covering strips to the fabric layer to be applied therewith as a unit, but my invention is not limited to thus applying all of the covering strips to the fabric layer to be utilized as a unit, and in addition to applying the chafing strips to this outer fabric layer I may also apply the side strips indicated at 8, Fig. 2, or both side and cushion strips, as indicated at 8 and 9 in Fig. 3.

Figure 4:
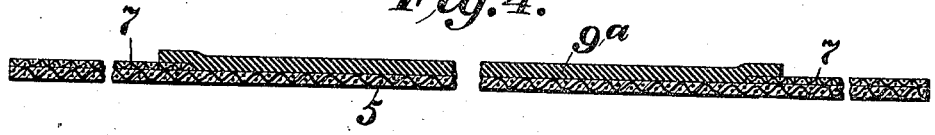
Fig. 4 is a similar view in which the side strips and cushion are formed from a single compound or strip.
Figure 5:
Fig. 5 is a view similar to Fig. 4 but with a thin surface layer of rubber applied over each side strip portion.

It is also obvious that if desired the side and cushion strips may be made of a single homogeneous stock, as indicated at $9^a$ in Fig. 4, and that to produce different colored sides thin covering layers of suitable color may be applied, as indicated at 10, in Fig. 5.

Figure 6:
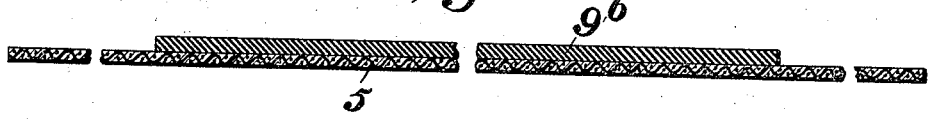
Fig. 6 is a similar view omitting the chafing strips.

In some instances chafing strips are not used, in which event only the side and cushion material might be applied to the fabric or carrying ply, as indicated at $9^b$ in Fig. 6.

Figure 7:
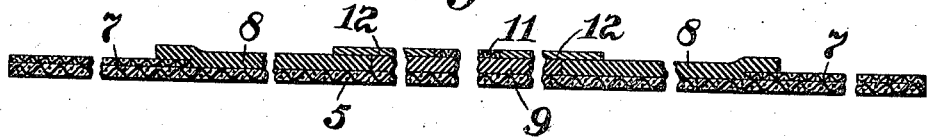
Fig. 7 is a view similar to Fig. 3 with breaker and filler strips incorporated in the unit.
Figure 8:
Fig. 8 is a similar view with the tread also incorporated in the unit.

Fig. 7 illustrates how in addition to the chafing strips and side and cushion strips the breaker strip 11 and filler strips 12 may be incorporated in the unit and Fig. 8 illustrates the further step of incorporating the tread 13 in the unit.

Figure 9:
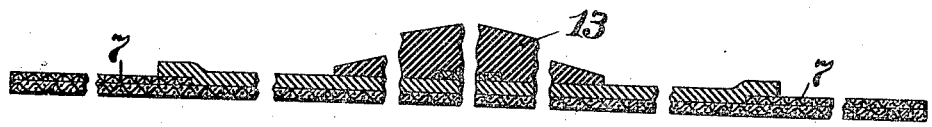
Fig. 9 is a similar view with filler strips omitted.

Fig. 9 illustrates a form in which the filler strips are either omitted or incorporated in the material of the tread.

What I claim is:

1. The hereindescribed method of forming a tire which consists in building up a carcass of layers of tire fabric containing less than the number of fabric plies in the finished tire and applying to said unfinished carcass a final layer of tire fabric forming a base for and carrying one or more finishing layers.

2. The hereindescribed method of forming a tire which consists in building up a carcass of layers of tire fabric containing less than the number of fabric plies in the finished tire and applying to said unfinished carcass a final layer of tire fabric carrying chafing strips on the margin thereof.

3. The hereindescribed method of forming a tire which consists in building up a carcass of layers of tire fabric containing less than the number of fabric plies in the finished tire and applying to said unfinished carcass a final layer of tire fabric carrying chafing strips and side strip material.

4. The hereindescribed method of forming a tire which consists in building up a carcass of layers of tire fabric containing less than the number of fabric plies in the finished tire and applying to said unfinished carcass a final layer of tire fabric carrying chafing strips and side and cushion strips.

5. The hereindescribed method of forming a tire which consists in building up a carcass of layers of tire fabric containing less than the number of fabric plies in the finished tire and applying to said unfinished carcass a final layer of tire fabric carrying chafing strips and side and cushion strips and also breaker and filler strips.

6. The hereindescribed method of forming a tire which consists in building up a carcass of layers of tire fabric containing one less than the number of fabric plies in the finished tire and applying to said unfinished carcass a final layer of tire fabric carrying chafing strips, side and cushion strips, and also breaker and filler strips and an outer tread.

In testimony whereof I affix my signature.

FERDINAND FRANCIS BRUCKER.